United States Patent
Aoyama et al.

(10) Patent No.: US 8,552,332 B2
(45) Date of Patent: Oct. 8, 2013

(54) BOLT FOR PROJECTION WELDING AND METHOD OF WELDING THE SAME

(75) Inventors: Yoshitaka Aoyama, Sakai (JP); Shoji Aoyama, Sakai (JP)

(73) Assignee: Yoshitaka Aoyama, Osaka (JP)

( * ) Notice: Subject to any disclaimer, the term of this patent is extended or adjusted under 35 U.S.C. 154(b) by 1110 days.

(21) Appl. No.: 11/990,984

(22) PCT Filed: Jun. 1, 2006

(86) PCT No.: PCT/JP2006/310964
§ 371 (c)(1),
(2), (4) Date: Feb. 26, 2008

(87) PCT Pub. No.: WO2007/094089
PCT Pub. Date: Aug. 23, 2007

(65) Prior Publication Data
US 2009/0261075 A1  Oct. 22, 2009

(30) Foreign Application Priority Data
Feb. 16, 2006 (JP) .................... 2006-073518

(51) Int. Cl.
*B23K 9/00* (2006.01)
(52) U.S. Cl.
USPC ............ 219/98; 219/86.1; 219/93; 219/99
(58) Field of Classification Search
USPC ............ 219/86.1, 93, 98, 99; 411/171, 376, 411/371, 374; 403/270, 271
See application file for complete search history.

(56) References Cited

U.S. PATENT DOCUMENTS

| 5,508,488 A | * | 4/1996 | Aoyama et al. | 219/93 |
| 5,541,383 A | * | 7/1996 | Renner et al. | 219/99 |

(Continued)

FOREIGN PATENT DOCUMENTS

| CN | 1708374 | 12/2005 |
| DE | 42 25 743 | 2/1994 |

(Continued)

OTHER PUBLICATIONS

Supplementary European Search Report issued Jul. 8, 2010 in corresponding European Patent Application No. 06747066.6.

(Continued)

*Primary Examiner* — Brian Jennison
(74) *Attorney, Agent, or Firm* — Wenderoth, Lind & Ponack, L.L.P.

(57) ABSTRACT

Provided are a bolt for projection welding and a method of welding the same in which a portion of large fusion depth is formed in a small region and in which junction to a steel sheet part is secured in other regions, thereby realizing high weld strength and stable junction state. A bolt includes a shaft part, an enlarged diameter part, and a fusion bonding projection, the fusion bonding projection including an initial fusion part having at an end surface thereof a tapered portion and a main fusion part continuous with the initial fusion part. Energization with welding current for fusing the fusion bonding projection only is effected on the fusion bonding projection, and in which through pressurization of the fusion bonding projection against a steel sheet part and subsequent energization thereof, a region of the fusion bonding projection is fusion-bonded to the steel sheet part, and an end surface of the enlarged diameter part on the outer peripheral side thereof is brought into junction with a surface of the steel sheet part. With this structure, it is possible to realize a satisfactory welding in an appropriate fused state.

21 Claims, 6 Drawing Sheets

(56) References Cited

U.S. PATENT DOCUMENTS

| | | | |
|---|---|---|---|
| 5,685,680 A | * | 11/1997 | Duffy et al. .................. 411/171 |
| 2003/0201254 A1 | * | 10/2003 | Sichtermann et al. ......... 219/98 |
| 2006/0070981 A1 | | 4/2006 | Aoyama et al. |

FOREIGN PATENT DOCUMENTS

| | | |
|---|---|---|
| FR | 2 723 769 | 2/1996 |
| JP | 63-132782 | 6/1988 |
| JP | 07-223078 | 8/1995 |
| JP | 08-001341 | 1/1996 |
| JP | 2004-174599 | 6/2004 |
| WO | 2004/048026 | 6/2004 |

OTHER PUBLICATIONS

International Search Report mailed Jul. 18, 2006 for International Application No. PCT/JP2006/310964.

Japanese Office Action drafted Jun. 15, 2007 for Japanese Application No. 2006-073518 with English translation.

International Preliminary Report on Patentability and Written Opinion of the International Searching Authority issued Aug. 19, 2008 in International (PCT) Application No. PCT/JP2006/310964.

* cited by examiner

BOLT FOR PROJECTION WELDING AND METHOD OF WELDING THE SAME

TECHNICAL FIELD

The present invention relates to a bolt for projection welding including a shaft part, an enlarged diameter part formed integrally with the shaft part, and a fusion bonding projection arranged at the center of the enlarged diameter part, and a method of welding the same.

BACKGROUND ART

Patent Document 1 mentioned below discloses a projection bolt, which is of a configuration as shown in FIG. 5A. A projection bolt 20 is formed of iron, and includes a shaft part 21 having a male screw, a circular enlarged diameter part 22 formed integrally with the shaft part 21 and having a diameter larger than that of the shaft part 21, and a circular fusion bonding projection 23 arranged at the center of the enlarged diameter part 22 on the side opposite to the shaft part 21. The fusion bonding projection 23 is a circular bulged portion having a diameter slightly smaller than that of the enlarged diameter part 22, and is equipped with a tapered portion 24 of a small inclination angle and a crest 25 whose central portion is pointed.

Patent Document 2 mentioned below discloses a projection bolt, which is of a configuration as shown in FIG. 5B. The projection bolt 20 is formed of iron, and differs from that shown in FIG. 5A in the configuration of the fusion bonding projection. That is, the end surface of the enlarged diameter part 22 is formed as a tapered surface 26 gradually reduced in height toward the outer periphery, with a fusion bonding projection 27 being formed at the center thereof. The fusion bonding projection 27 has at the end surface thereof a tapered portion 28 of a small inclination angle and a crest 29 whose central portion is pointed.

When the projection bolt 20 of FIG. 5A, 5B is welded to a steel sheet part 30 by electric resistance welding, a fusion bonding state is attained in which a gap L1 is formed in the periphery as shown in FIG. 5C, or an overall fusion bonding state is attained in which there is no gap L1 as shown in FIG. 5D. In the drawings, the region filled with black is the fusion bonding portion, which is indicated by reference numeral 31.
[Patent Document 1] JP 07-223078 A
[Patent Document 2] JP 2004-174599 A

DISCLOSURE OF THE INVENTION

Problems to be Solved by the Invention

When the bolt 20 of FIG. 5A is welded, the fusion bonding state as shown in FIG. 5C is attained. In this case, the fusion bonding area is large, and the current density is generally small, so the fusion depth L2 on the steel sheet part 30 side is small. When the fusion depth L2 is thus small, sufficient weld strength cannot be ensured, so when a bending load to tilt the shaft part 21 is applied to the shaft part 21, the fusion bonding portion will be easily separated. Such separation is more liable to be caused by a bending load when the gap L1 exists. Alternatively, there is a fear of the shaft part 21 being welded in an inclined state due to the gap L1. Further, when the gap L1 exists, variation is generated in the length as measured from the surface of the steel sheet part 30 to the end of the shaft part 21, i.e., the shaft part length L3, so a satisfactory quality in terms of precision cannot be attained.

When an overall junction state as shown in FIG. 5D is attained, the problem of the gap L1 is not involved, but the problem in terms of weld strength as mentioned above occurs since the fusion depth L2 is small.

When the bolt 20 shown in FIG. 5B is welded, the fusion bonding state attained is as shown in FIGS. 5C and 5D. At the initial stage, the fusion bonding projection 27 is fused rapidly, and then the fusion expands to the tapered surface 26 portion. Thus, the fused portion strongly tends to expand two-dimensionally, so the fusion depth L2 is reduced.

When the current value is increased or the energization time is elongated in order to increase the fusion depth L2 to thereby enhance the weld strength, the steel sheet part 30 becomes subject to abnormal fusion over the entire thickness thereof, that is, excessive fusion in which the entire thickness of the steel sheet part 30 suffers fusion loss. On the other hand, excessive fusion also occurs on the enlarged diameter part 22 side, resulting in a reduction in the thickness of the enlarged diameter part 22. When the above-mentioned excessive fusion occurs on the steel sheet part 30 side, the above-mentioned bending load is repeatedly applied, whereby the boundary portion between the fusion part and the non-fusion part becomes subject to rupture. Further, due to the excessive fusion in the thickness direction, the thickness of that portion of the steel sheet part becomes smaller than that of the other portion thereof, so the steel sheet part suffers damage even under a slight bending load. When the thickness of the enlarged diameter part 22 also undergoes a change, it is rather difficult to make the shaft part length L3 uniform. Further, when the above-mentioned excessive fusion occurs to the steel sheet part 30, the steel sheet part 30 suffers fusion loss in extreme cases; thus, increasing the current value and elongating the energization time give rise to the problems as mentioned above. Further, the power consumption also increases, which is disadvantageous from the economical viewpoint.

While Patent Document 2 discloses a fusion bonding range larger than the fusion bonding projection 27 and formed at the central portion, this does not help to secure a sufficient weld strength due to the small fusion depth L2. Further, in the technology disclosed in Patent Document 2, the thickness of the steel sheet part is reduced beforehand by the fusion bonding projection at the time of pressurization. Thus, it is rather difficult to attain a sufficient fusion depth at the thinned portion. Further, it is necessary to set the pressurization force large; further, uniform control of the pressurization force is an important factor. Such a pressurization force of a uniform value requires high precision control, which is not advantageous from the viewpoint of practical use.

The present invention has been made with a view toward solving the above problems. It is an object of the present invention to provide a bolt for projection welding and a method of welding the same in which a portion of large fusion depth is formed in a small region and in which junction to a steel sheet part is secured in other regions, thereby realizing high weld strength and stable junction state.

In the following description, the projection bolt will also be simply referred to as bolt.

Means for Solving the Problems

According to an aspect of the present invention, a bolt for projection welding includes: a shaft part having a male screw; a circular enlarged diameter part formed integrally with the shaft part and having a diameter larger than that of the shaft part; and a circular fusion bonding projection including: an initial fusion part having at an end surface thereof a tapered portion of a small inclination angle leading to a reduction in height toward an outer periphery; and a main fusion part continuous with the initial fusion part, the fusion bonding projection being arranged at a center of the enlarged diameter part on a side opposite to the shaft part, in which energization with welding current for fusing the fusion bonding projection only is effected on the fusion bonding projection, and in which through pressurization of the fusion bonding projection against a steel sheet part and subsequent energization thereof, a region of the fusion bonding projection is fusion-bonded to the steel sheet part, and an end surface of the enlarged diameter part on the outer peripheral side thereof is brought into junction with a surface of the steel sheet part.

Effects of the Invention

When, after pressurization of the fusion bonding projection against the steel sheet part, welding current is supplied, the initial fusion part is fused over the entire area thereof at the initial stage of energization. A tapered portion of a small inclination angle is formed in the initial fusion part, so, in this fusion, a radial and substantially planar fusion range expands in the diametric direction in a circle along with the pressurization. Transition is effected from the overall fusion of the initial fusion part to the fusion of the main fusion part over the entire circular section thereof, and fusion progresses in the axial direction of the bolt. At the time when this progress of fusion is completed, fusion has also progressed in the steel sheet part in an area range corresponding to the fusion bonding projection. By stopping energization at this time, the fusion range is restricted to the region of the fusion bonding projection. Further, by the above-mentioned pressurization, the end surface of the enlarged diameter part in the outer periphery of the fusion bonding projection is intimately joined to the surface of the steel sheet part.

As stated above, the overall fusion of the initial fusion part is turned into fusion of the main fusion part over the entire circular section thereof and progresses in the axial direction of the bolt, so the fusion occurring on the steel sheet part side is restricted to the region of the fusion bonding projection. Since it is a fusion thus restricted, the fusion depth on the steel sheet part side increases, thereby improving the weld strength. At the same time, since the end surface of the enlarged diameter part in the outer periphery of the fusion bonding projection is brought into junction with the surface of the steel sheet part, the sufficient weld strength at the central portion and the above-mentioned junction are combined to make it possible to secure high weld strength while avoiding bolt inclination and achieving a uniform shaft part length. Thus, even if a bending load is applied, the fusion bonding portion is not easily separated. Further, since the energization is effected such that solely the fusion bonding projection is fused, it is only necessary to set energization conditions such as the current value, energization time, etc. suited to the volume of the fusion bonding projection, so the factors for setting the energization conditions are simplified and the energization control is easier to perform, thereby stabilizing the welding quality. At the same time, the power consumption is reduced, which is advantageous from the economical viewpoint.

That is, a fusion bonding state in which the fusion depth at the central portion is large is attained in a small region, and the end surface region spaced apart from the fusion bonding portion and extending to the peripheral edge portion of the enlarged diameter part is held in junction with the steel sheet part. Thus, the requisite weld strength is secured at the central portion, and high rigidity with respect to a bending load is obtained by virtue of the above-mentioned junction and the fusion bonding of the central portion.

In the bolt for projection welding, the outer peripheral portion of the enlarged diameter part and the base portion of the fusion bonding projection are connected at the end surface of the enlarged diameter part by the inclined surface whose outer peripheral portion is reduced in height to thereby form a plastic deformation portion, which may include a circular fusion part at the center having a thickness corresponding to the inclination angle of the inclined surface and an annular softening portion gradually reduced in thickness from the base portion toward the outer peripheral portion.

The plastic deformation portion includes a circular fusion part at the center having a thickness corresponding to the inclination angle of the inclined surface and an annular softening portion gradually reduced in thickness from the base portion toward the outer peripheral portion. If solely the fusion bonding projection is fused, the fusion part of the plastic deformation portion continuous therewith is also placed in a fused state, and the fusion heat is conducted to the softening portion to soften this portion. Since the pressurization force is applied continuously, the end surface of the inclined enlarged diameter part, that is, the softening portion, is joined to the surface of the steel sheet part, with the metal material of the softening portion flowing toward the fused portion at the center.

The metal material of the softening portion tends to flow toward the outer periphery due to the pressurization; however, due to the reaction force thereof, it flows toward the fused portion at the center with deformability to effect the above-mentioned junction. At this time, the flow pressure of the metal material is applied to the fused portion at the center from the outer peripheral side, so the fused portion expands and grows in the axial direction of the bolt, whereby the fusion depth of the steel sheet part increases. Further, the portion of the softening portion nearer to the fusion part and having a larger thickness is at a higher temperature than the portion thereof on the outer peripheral side, so sufficient deformability is obtained for the portion with large thickness, making it possible to secure a satisfactory flow of the metal material toward the fusion part.

Due to the fusion and deformation behavior of the plastic deformation portion as described above, fusion of the portion restricted to the region of the fusion bonding projection is attained, and, further, the fusion depth thereof is of a sufficient value in terms of weld strength. Further, the softening portion is heated by the fusion heat of the fusion bonding projection and the fusion part, so its deformability is satisfactory, allowing the end surface of the inclined enlarged diameter part to be reliably joined to the surface of the steel sheet part.

The ratio of the diameter of the fusion bonding projection with respect to the diameter of the enlarged diameter part may be 0.3 to 0.6.

When the above-mentioned ratio is less than 0.3, the fusion range will be excessively small, resulting in a rather insufficient weld strength. On the other hand, when the above-mentioned ratio exceeds 0.6, while a sufficient fusion range can be secured, the dimension in the diametric direction of the junction portion between the end surface of the enlarged diameter part and the surface of the steel sheet part is rather insufficient, making it impossible to secure the requisite rigidity with respect to the bending load on the shaft part. Thus, by setting the above-mentioned ratio to 0.3 to 0.6, it is possible to secure sufficient weld strength.

The ratio of the volume of the main fusion part with respect to the volume of the initial fusion part may be 4.0 to 6.5.

When the above-mentioned ratio is less than 4.0, the volume of the initial fusion part will be excessively large, and the heat capacity thereof will be excessive; further, the volume of the fusion bonding projection itself will also be excessive, so the fusion amount in the thickness direction of the steel sheet part will become excessive due to the fusion of the fusion bonding projection as a whole, thus making it impossible to attain an appropriate weld strength. On the other hand, when the above-mentioned ratio exceeds 6.5, the volume of the initial fusion part becomes excessively small, and the heat capacity thereof becomes insufficient, so it is impossible to continuously fuse the main fusion part, with the result that the fusion depth of the steel sheet part is insufficient. Thus, by setting the above-mentioned ratio to 4.0 to 6.5, it is possible to secure sufficient weld strength.

The volume of the fusion bonding projection may be set smaller than the volume of the plastic deformation portion.

Since the volume of the fusion bonding projection is set smaller than the volume of the plastic deformation portion, the plastic deformation portion is not fused to flow toward the outer periphery by the amount of heat fusing the fusion bonding projection, the plastic deformation portion being only placed in a heated state. That is, while Joule heat that is continuously generated is gradually conducted to the plastic deformation portion via the fused portion of the fusion bonding projection to fuse the fusion part, the softening portion is not heated to such a degree as to be fused but is only heated to be softened. Thus, the fusion range is restricted to the region of the fusion bonding projection; further, the fusion in the thickness direction of the steel sheet part is promoted, whereby a predetermined fusion depth is attained.

The ratio of the volume of the plastic deformation portion with respect to the volume of the fusion bonding projection may be 1.3 to 2.0.

When the above-mentioned ratio is less than 1.3, the volume of the plastic deformation portion becomes excessively small with respect to the volume of the fusion bonding projection, and the softening portion of the plastic deformation portion is fused to flow toward the outer periphery by the fusion heat of the fusion bonding projection. In this way, the fusion heat of the fusion bonding projection is spent on the fusion of the softening portion, so the fusion amount of the steel sheet part in the thickness direction becomes insufficient, resulting in an insufficient fusion depth. At the same time, when the plastic deformation portion is fused toward the outer periphery, while the fusion range is enlarged, the fusion depth becomes insufficient. When the above-mentioned ratio exceeds 2.0, the volume of the plastic deformation portion becomes excessively large with respect to the volume of the fusion bonding projection, and the heating of the softening portion with the fusion heat of the fusion bonding projection becomes insufficient, making it impossible to attain softening of the softening portion. Thus, the fusion amount of the steel sheet part in the thickness direction becomes insufficient, resulting in an insufficient fusion depth. Thus, by setting the above-mentioned ratio to 1.3 to 2.0, it is possible to secure sufficient weld strength.

The inclination angle of the tapered portion of the initial fusion part may be set to 5 to 14 degrees.

When the above-mentioned inclination angle is less than 5 degrees, the expansion of the fusion bonding portion progresses rapidly even with a slight pressurization displacement, so the control of the pressurization force is rather difficult to perform. Further, with the pressurization, a reduction in the current density progresses rapidly, so the generation of Joule heat becomes slow, whereby a state is attained in which the transition to the fusion of the main fusion part cannot be effected smoothly. When the inclination angle exceeds 14 degrees, the progress of the expansion of the fusion bonding portion becomes slow even with a large pressurization displacement, so the control of the pressurization force is difficult to perform, and, at the same time, a state is attained in which the transition to the fusion of the main fusion part cannot be effected smoothly. Further, when the inclination angle increases to exceed 14 degrees, the volume of the fusion bonding projection with respect to the volume of the plastic deformation portion becomes large, making it impossible to effect proper heating and softening on the plastic deformation portion. Thus, by setting the above-mentioned inclination angle to 5 to 14 degrees, it is possible to secure a bolt welding of satisfactory quality.

The inclination angle of the inclined surface of the plastic deformation portion may be set to 5 to 14 degrees.

When the above-mentioned inclination angle is less than 5 degrees, the force component causing the metal material of the softening portion to flow toward the fused portion at the center through pressurization is reduced, so there is a shortage of pressurization force applied from the outer periphery to the fused portion, and the expansion and growth of the fused portion in the axial direction of the bolt becomes slow, making it impossible to secure a sufficient fusion depth. At the same time, the volume of the plastic deformation portion with respect to the volume of the fusion bonding projection becomes excessively small, making it impossible to properly obtain the ratio of the two volumes. When the above-mentioned inclination angle exceeds 14 degrees, the volume of the plastic deformation portion with respect to the volume of the fusion bonding projection becomes excessively large, making it rather difficult to fuse the fusion part of the plastic deformation portion and to heat the softening portion with the fusion heat of the fusion bonding projection. At the same time, the fusion heat of the fusion bonding projection is excessively taken away by the plastic deformation portion, resulting in an insufficient fusion depth of the steel sheet part. Thus, by setting the above-mentioned inclination angle to 5 to 14 degrees, it is possible to secure a bolt welding of satisfactory quality.

By specifying the above-mentioned various values, etc., the fusion range is limited as described above through the fusion of the fusion bonding projection only, and an appropriate fusion depth is secured; further, the end surface of the enlarged diameter part is reliably joined to the surface of the steel sheet part.

According to another aspect of the present invention, there is provided, in order to solve the above-mentioned problems, a method of welding a bolt for projection welding, the method including the steps of: preparing a bolt for projection welding including: a shaft part having a male screw; a circular enlarged diameter part formed integrally with the shaft part and having a diameter larger than the shaft part; and a circular fusion bonding projection including an initial fusion part having at its end surface a tapered portion of a small inclination angle gradually reduced in height toward the outer periphery and a main fusion part continuous with the initial fusion part and arranged at the center of the enlarged diameter part on the side opposite to the shaft part; energizing the fusion bonding projection after pressurizing it against a steel sheet part; and effecting welding under pressurization and energization conditions set such that solely the fusion bonding projection is fused, with the region thereof being fusion-bonded to the steel sheet part, and that the end surface of the enlarged diameter part in the outer periphery thereof is joined to the surface of the steel sheet part.

As stated above, the pressurization and energization conditions are set such that solely the fusion bonding projection is fused, with the region thereof being fusion-bonded to the steel sheet part, and that the end surface of the enlarged diameter part on the outer peripheral side thereof is joined to the surface of the steel sheet part. At this time, the fusion progresses as follows: the total fusion of the initial fusion part is turned into the fusion of the entire circular section of the main fusion part and progresses in the axial direction of the bolt, and with the progress, the fusion caused on the steel sheet part side is limited to the region of the fusion bonding projection. Since the fusion is thus limited, the fusion depth on the steel sheet part side increases, and the weld strength is enhanced. At the same time, there is effected junction of the end surface of the enlarged diameter part on the outer peripheral side of the fusion bonding projection to the surface of the steel sheet part, so the sufficient weld strength at the central portion and the above-mentioned junction are combined with each other, making it possible to secure high weld strength without involving any bolt inclination, with the shaft part length being uniform. Thus, even if a bending load is applied, the fusion bonding portion is not easily separated. Further, since solely the fusion bonding projection is to be fused through energization, it is only necessary to set the energization conditions such as current value and energization time to values adapted to the volume of the fusion bonding projection, whereby factors setting the energization condition are simplified, and the energization control is easier to perform, thereby stabilizing the weld quality. At the same time, the power consumption is reduced, which is advantageous from the economical viewpoint.

That is, a fusion-bonded state of large fusion depth is formed in a small region at the center, and the end surface region spaced apart from this fusion bonding portion and extending to the peripheral edge portion of the enlarged diameter part is brought into junction with the steel sheet part. Thus, the requisite weld strength is secured at the central portion, and high rigidity against a bending load is obtained through the above-mentioned junction and the fusion bonding of the central portion.

The pressurization and energization conditions are set so as to secure in a satisfactory state the above-mentioned fusion range, fusion depth and junction of the end surface of the enlarged diameter part. The conditions are set so as to fuse solely the fusion bonding projection; as the conditions, the current value and the energization time are set to predetermined values, of which the energization time is of particular importance. The energization is started after the pressurization, and is continued from the fusion start of the initial fusion part to the completion of the fusion of the main fusion part. The pressurization force applied to the steel sheet part is set such that the fusion range of the fusion bonding projection does not expand to the outer peripheral side and that the fusion depth of the steel sheet part attains a predetermined value. Further, the end surface of the enlarged diameter part is joined to the surface of the steel sheet part, with the above-mentioned fusion range and fusion depth being properly obtained.

Formed on the bolt for projection welding is a plastic deformation portion connecting the outer peripheral portion of the enlarged diameter part and the base portion of the fusion bonding projection by an inclined surface gradually lowered toward the outer periphery; this plastic deformation portion may be formed by a circular fusion part at the center having a thickness corresponding to the inclination angle of the inclined surface, and an annular softening portion gradually reduced in thickness from the base portion toward the outer peripheral portion, with the deformation of the softening portion being promoted by the fusion heat of the circular fusion part.

The plastic deformation portion is formed by a circular fusion part at the center having a thickness corresponding to the inclination angle of the inclined surface, and an annular softening portion gradually reduced in thickness from the base portion toward the outer peripheral portion. If solely the fusion bonding projection is fused, the fusion part of the plastic deformation portion continuous therewith also attains a fused state, and the fusion heat is conducted to the softening portion to soften this portion. Since the pressurization force is continuously applied, junction of the end surface of the inclined enlarged diameter part, that is, the softening portion, to the surface of the steel sheet part is effected, with the metal material of the softening portion flowing toward the fused portion at the center.

The metal material of the softening portion tends to flow to the outer peripheral side due to pressurization; however, due to the reaction force thereof, it flows toward the fused portion with deformability at the center to thereby cause the above-mentioned junction. At this time, the flow pressure of the metal material is applied from the outer peripheral side to the fused portion at the center, so the fused portion expands and grows in the axial direction of the bolt, whereby the fusion depth of the steel sheet part increases. Further, the portion of the softening portion with larger thickness nearer to the fusion part exhibits a temperature higher than the outer peripheral portion thereof, so sufficient deformability is obtained for the portion with larger thickness, making it possible to secure a satisfactory flow of the metal material toward the fusion part.

Due to the fusion and deformation behavior of the plastic deformation portion as described above, fusion of the portion limited to the region of the fusion bonding projection is effected. Further, the fusion depth attains a sufficient value in terms of weld strength. Further, since the softening portion is heated by the fusion heat of the heat bonding projection and the fusion part, its deformability is satisfactory, and junction of the end surface of the inclined enlarged diameter part to the surface of the steel sheet part is reliably effected.

The pressurization and energization conditions may be ones suitable for the fusion of the region of the fusion bonding projection and the steel sheet part opposed thereto.

Due to the setting of such pressurization and energization conditions, the fusion range is set to the range of the fusion bonding projection, making it possible to set the fusion depth to a predetermined value.

The supply of the welding current may be executed until the completion of the fusion of the main fusion part subsequent to the fusion of the entire initial fusion part at an early stage of energization.

By performing this energization control, it is possible to properly fuse the fusion bonding projection alone.

Further, as is apparent from the embodiments described below, by executing the welding method, with the various values, etc. specified, it is possible to realize a satisfactory welding as described above.

Figure 1A:
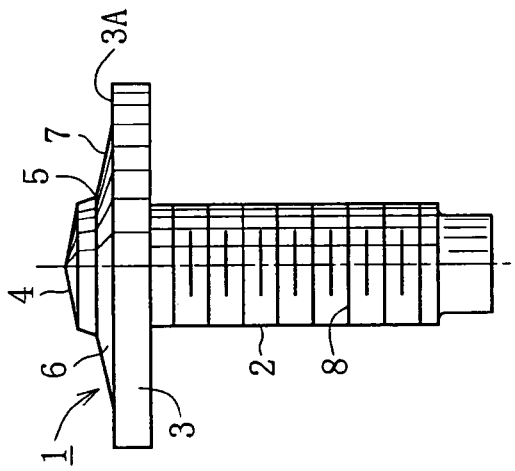
FIG. 1A is a front view of a projection bolt according to an embodiment of the present invention.

DESCRIPTION OF SYMBOLS 1 bolt for projection welding
2 shaft part
3 enlarged diameter part
4 fusion bonding projection
4A initial fusion part
4B main fusion part
5 base portion
6 inclined surface, end surface
7 plastic deformation portion
7A fusion part
7B softening portion
9 steel sheet part
9A surface
15 tapered portion
16 crest
17 fused portion, fused portion, fusion bonding part, fusion range
θ1 inclination angle
θ2 inclination angle Best Mode For Carrying Out The Invention Next, a best mode for realizing a bolt for projection welding according to the present invention and a method of welding the same will be described.

Embodiment 1

The dimensions and configuration of a bolt for projection welding will be described.

FIG. 1A shows the configuration of a bolt for projection welding formed of iron. The bolt 1 includes a shaft part 2 having a male screw, a circular enlarged diameter part 3 formed integrally with the shaft part 2 and having a larger diameter than the shaft part 2, a circular fusion bonding projection 4 arranged at the center of the enlarged diameter part on the side opposite to the shaft part 2, and a plastic deformation portion 7 formed by connecting the outer peripheral portion of the enlarged diameter part 3 and a base portion 5 of the fusion bonding projection 4 by an inclined surface 6 lowered on the outer peripheral side. The expression: "lowered on the outer peripheral side" implies that, as shown in FIG. 1A, the inclined surface is inclined such that the outer peripheral portion thereof is closer to the lower end of the shaft part. Reference numeral 8 indicates a male screw formed on the outer peripheral surface of the shaft part 2, and threads of the shaft part 2 have troughs and crests.

Figure 4A:
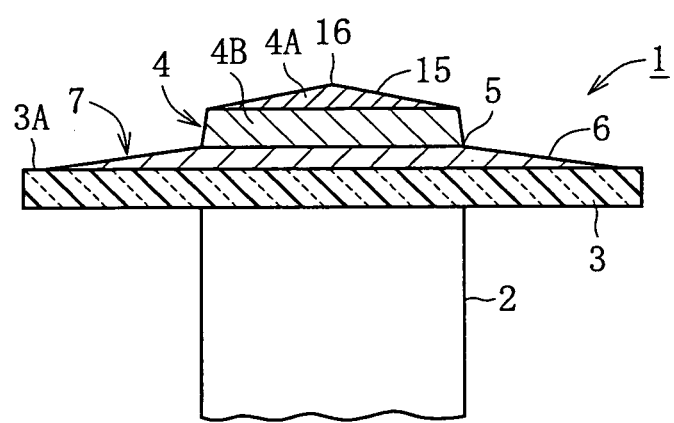
FIG. 4A is a diagram illustrating how volume division is effected on the bolt parts.

As shown in FIG. 4A, the fusion bonding projection 4 includes an initial fusion part 4A and a main fusion part 4B.

The initial fusion part 4A is a smooth conical part formed by providing on the end surface of the fusion bonding projection 4 a tapered portion 15 of a small inclination angle leading to a reduction in height on the outer peripheral side. A pointed crest portion 16 is formed at the center of the initial fusion part 4A. Further, the main fusion part 4B is formed so as to be continuous with the initial fusion part 4A.

The configuration of the plastic deformation portion 7 will be described.

Figure 4B:
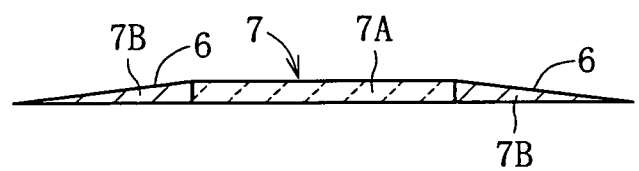
FIG. 4B is a diagram illustrating how volume division is effected on the bolt parts.

As shown in FIG. 4A, the plastic deformation portion 7 is a flat and circular metal material portion existing between the fusion bonding projection 4 (main fusion part 4B) and the enlarged diameter part 3, and FIG. 4B is a sectional view exclusively showing the plastic deformation portion. The circular portion at the center having a thickness corresponding to the inclination angle of the inclined surface 6 constitutes a fusion part 7A. The annular portion whose thickness is gradually reduced from the fusion part 7A (base portion 5) toward the outer peripheral portion constitutes a softening portion 7B. As shown in FIG. 4B, the softening portion 7B has a wedge-shaped sectional configuration.

It should be noted that the inclination angle of the inclined surface 6 implies the angle made between itself and an imaginary plane perpendicularly crossed by the axis of the shaft part 2. This also applies to the inclination angle of the tapered portion 15 of the fusion bonding projection 4. The head portion of the bolt 1 is formed by the flange-like enlarged diameter part 3, the plastic deformation portion 7, and the fusion bonding projection 4. The inclined surface 6 constitutes the end surface of the enlarged diameter part 3. FIGS. 1A and 4A show a flat portion 3A without inclination which is provided in the outer periphery of the inclined surface 6 and which also constitutes the end surface of the enlarged diameter part 3.

Figure 2:
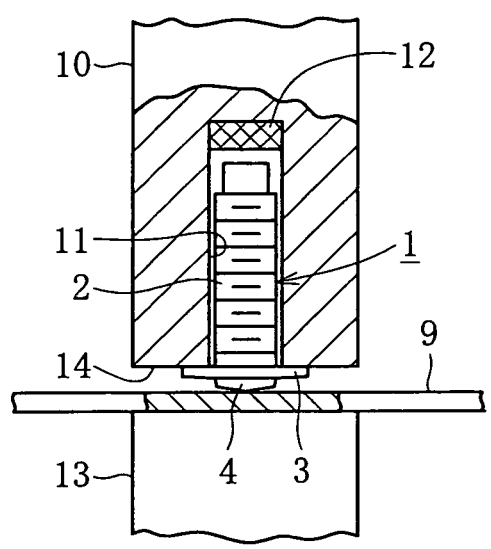
FIG. 2 is a sectional view showing how the bolt is welded.

FIG. 2 is a sectional view illustrating how the bolt 1 is welded to a steel sheet part 9. A movable electrode 10 is caused to make a retracting motion by an air cylinder or an retractable type electric motor (not shown). At the center of the end surface thereof, there is provided a reception hole 11 extending in the longitudinal direction of the movable electrode 10, and a permanent magnet 12 is mounted at the bottom of the reception hole. A steel sheet part 9 is placed on a stationary electrode 13 arranged coaxially with the movable electrode 10.

The shaft part 2 is inserted into the reception hole 11 of the movable electrode 10 by an operator or a feeding rod, and is attracted by the permanent magnet 12, whereby the bolt 1 is retained by the movable electrode 10. At this time, an end surface 14 of the movable electrode 10 is held in intimate contact with the back surface of the enlarged diameter part 3. FIG. 2 shows a state in which the movable electrode 10 retaining the bolt 1 advances, causing the fusion bonding projection 4 to be pressed against the steel sheet part 9. In this state, welding current is supplied, and welding to the steel sheet part 9 is effected.

Figure 1B:
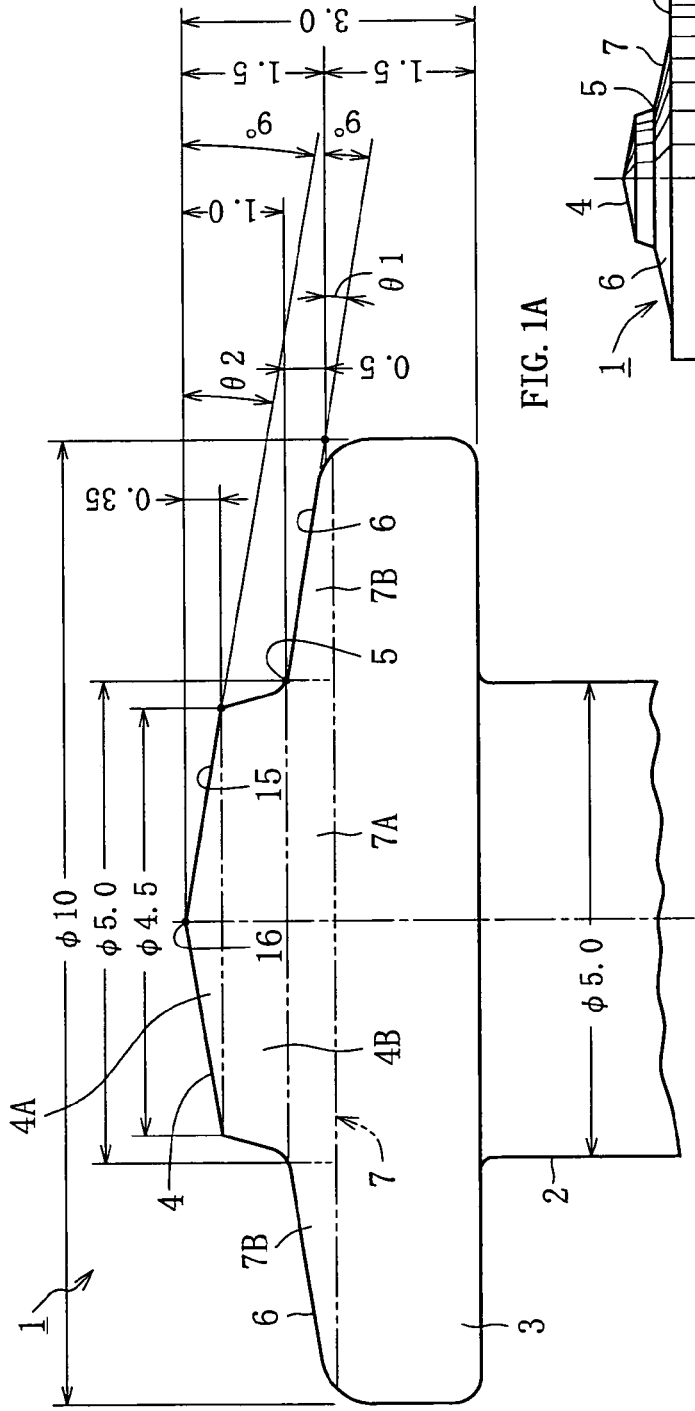
FIG. 1B is a partial enlarged view of the projection bolt of FIG. 1A.

In order to facilitate the understanding the dimensional condition, etc. of the embodiment, FIG. 1B shows the dimensions and inclination angles of the different portions. As shown in the drawing, the diameter of the shaft part 2 is 5 mm, the diameter and the thickness of the enlarged diameter part 3 are 10 mm and 1.5 mm, respectively, and the diameter of the base portion 5 of the fusion bonding projection 4, that is, the base portion of the fusion bonding projection 4, is 5 mm.

Further, the diameter of the end surface (tapered portion 15) of the fusion bonding projection 4 is 4.5 mm, the height of the fusion bonding projection 4 as measured from the base portion 5 to the crest 16 is 1.0 mm, the height (thickness) of the initial fusion part 4A is 0.35 mm, the height (thickness) of the plastic deformation portion 7 is 0.5 mm, an inclination angle θ1 of the inclined surface 6 is 9 degrees, and an inclination angle θ2 of the tapered portion 15 of the fusion bonding projection 4 is 9 degrees.

Thus, the ratio of the diameter of the fusion bonding projection 4 with respect to the diameter of the enlarged diameter part 3 is 0.5. The ratio of the diameter of the enlarged diameter part 3 with respect to the diameter of the shaft part 2 is 2.0.

FIG. 4 is a divisional view for showing the respective volumes of the enlarged diameter part 3, the plastic deformation portion 7, the fusion bonding projection 4, and the initial fusion part 4A and the main fusion part 4B constituting the fusion bonding projection 4. The respective volumes of the different portions of the bolt 1, having the dimensions and inclination angles as shown in FIG. 1B, are as follows: the enlarged diameter part 3, 117.75 mm$^3$; the plastic deformation portion 7, 24.53 mm$^3$; the fusion bonding projection 4, 14.80 mm$^3$; the initial fusion part 4A, 2.38 mm$^3$; and the main fusion part 4B, 12.42 mm$^3$. Further, the volume of the fusion part 7A of the plastic deformation portion 7 is 9.81 mm$^3$, and the volume of the softening portion is 14.72 mm$^3$. As is apparent from the above values, the volume of the fusion bonding projection 4 is set smaller than the volume of the plastic deformation portion 7.

The ratio of the volume of the main fusion part 4B with respect to the volume of the initial fusion part 4A is 5.2. The ratio of the volume of the plastic deformation portion 7 with respect to the volume of the fusion bonding projection 4 is 1.66. Further, the ratio of the volume of the enlarged diameter part 3 with respect to the sum of the volume of the fusion bonding projection 4 and the volume of the plastic deformation portion 7 is 2.99. Further, the sum of the volume of the fusion bonding projection 4 and the volume of the plastic deformation portion 7 is set smaller than the volume of the enlarged diameter part 3.

As is apparent from the above-mentioned dimensions of the different portions, the bolt 1 is a so-called small article. In such a small article, the progress of fusion, the size of the fusion bonding portion (nugget), etc. greatly affect the welding quality.

Next, the phenomenon of fusion bonding in the case of the bolt 1 will be described.

As stated above, welding is performed in the state as shown in FIG. 2. The pressurization and energization conditions are set such that exclusively the fusion bonding projection 4 is fused and that the portion of the steel sheet part 9 corresponding to the area of the range of the fusion bonding projection 4 is fused. Here, the thickness of the steel sheet part 9, which constitutes the mating member, is 0.7 mm. Further, the pressurization force due to the movable electrode 10, that is, the pressurization force of the fusion bonding projection 4 with respect to the steel sheet part 9, is 2900 N, the welding current is 10600 A, the initial pressurization time is 60 cycles, the energization time is 9 cycles, and the retention time is 30 cycles. The energization time of 9 cycles is the time from the start of the fusion of the initial fusion part 4A to the completion of the subsequent fusion of the main fusion part 4B; at this point in time, fusion is also effected on the fusion part 7A and on the steel sheet part 9 side. Here, one cycle is 1/60 sec.

While a satisfactory welding is possible under the above conditions, the setting ranges for the conditions are preferably set as follows: the pressurization force; 2000 through 5000 N; the welding current; 8000 through 15000 A; and the energization time; 5 through 15 cycles.

Figure 3A:
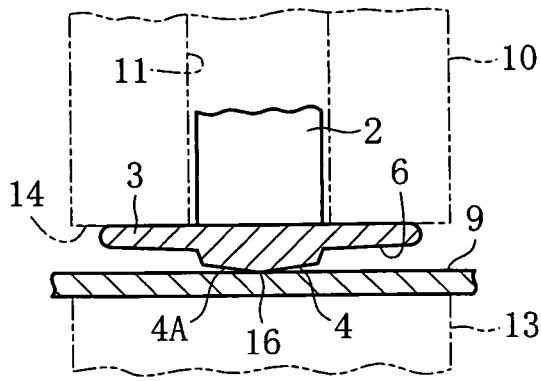
FIG. 3A is a sectional view illustrating a welding step.

FIGS. 3A through 3G show the steps of the fusion which progresses under the above welding conditions. FIG. 3A shows how the crest 16 of the fusion bonding projection 4 is pressed against the steel sheet part 9. While it is not shown, in this state, the crest 16 is slightly sunken in the steel sheet part 9.

Figure 3B:
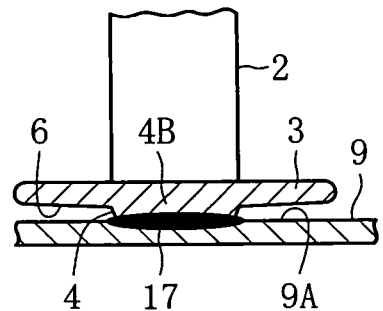
FIG. 3B is a sectional view illustrating a welding step.

When energization is effected in the above pressurized state, fusion starts at the above-mentioned portion that is sunken in, Further, as shown in FIG. 3B, at the initial stage of energization, the initial fusion part 4A is fused over the entire area thereof. The fused portion is indicated by reference numeral 17. In this fusion started at the crest 16, due to the formation of the taper angle, i.e., the inclination angle θ2=9 degrees, on the tapered portion 15 of the initial fusion part 4A, a substantially planar radial fusion range expands in the diametric direction in a circular configuration with pressurization. That is, since the inclination angle θ2 is small, the energization area rapidly increases even with slight fusion, and with the rapid increase in the energization area, the current density rapidly decreases. Thus, the expansion of fusion is more likely to progress in the diametric direction than in the axial direction of the bolt 1, which has large heat capacity. It should be noted that the following terms: fused portion; fusion bonding portion; fusion-bonded portion; and fusion range, are synonymous with the term fusion portion; the portion referred to by those terms being indicated by reference numeral 17.

Figure 3C:
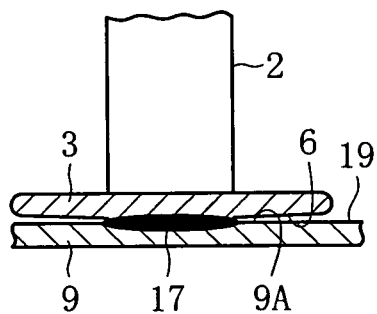
FIG. 3C is a sectional view illustrating a welding step.

Transition is effected from this overall fusion of the initial fusion part 4A to fusion over the entire circular section of the main fusion part 4B, and as shown in FIG. 3c, fusion progresses in the axial direction of the bolt 1. At the time when this progress of fusion is completed, fusion progresses also in the steel sheet part 9 over a range corresponding to the sectional area range of the fusion bonding projection 4 with pressurization, the energization being stopped at this time. As a result, a state is attained in which the fusion range is restricted to the region of the fusion bonding projection 4. As shown in FIG. 3C, at this stage, a slight gap 19 exists between the inclined surface 6 and the surface 9A of the steel sheet part 9. However, through pressurization of the movable electrode 10, the gap 19 disappears substantially simultaneously with the stop of energization, and as shown in FIG. 3D, the inclined surface 6 is brought into junction with the surface 9A of the steel sheet part 9.

Figure 3D:
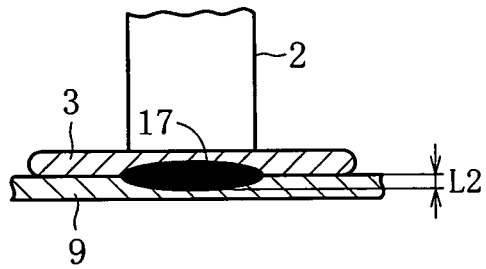
FIG. 3D is a sectional view illustrating a welding step.
Figure 3E:
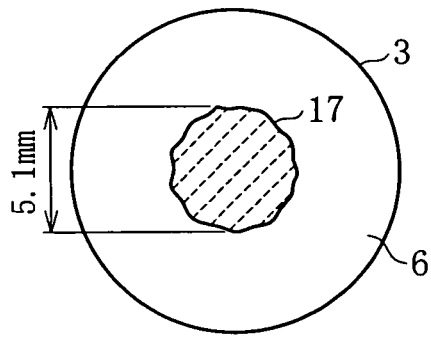
FIG. 3E is a sectional view illustrating a welding step.

FIG. 3(E) is a plan sectional view of the junction portion of FIG. 3D taken in the planar direction of the steel sheet part 9. As is apparent from this sectional view, the fused portion 17, that is, the fusion bonding portion, has substantially the same diameter as the fusion bonding projection 4. The diameter of the fused portion 17 is 5.1 mm. Welding ten bolts 1 resulted in this dimension ranging from 4.9 to 5.2 mm. Thus, it was recognized that the fusion bonding range was proper.

Next, the deformation behavior of the plastic deformation portion 7 will be described.

Figure 3F:
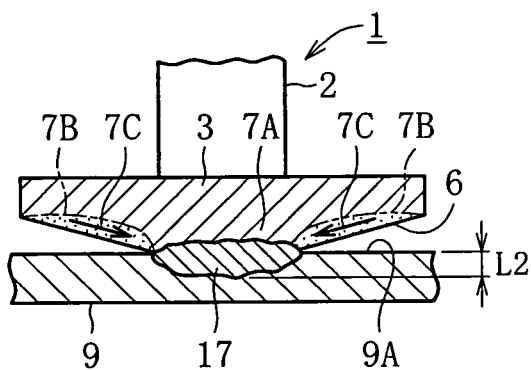
FIG. 3F is a sectional view illustrating a welding step.
Figure 3G:
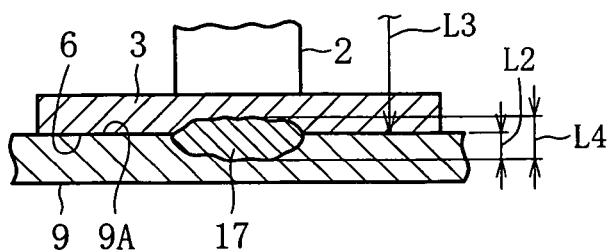
FIG. 3G is a sectional view illustrating a welding step.

In the above-mentioned process of pressurization and fusion, the following deformation behavior of the plastic deformation portion 7 is to be observed. This deformation behavior is illustrated in FIGS. 3F and 3G; in order to facilitate the understanding, the inclination angle of the inclined surface 6 is exaggerated in FIG. 3F. For detailed observation of the fused portion 17, the fused portion was cut out. FIG. 3G is a sectional view of the cut surface.

The plastic deformation portion 7 includes a circular fusion part 7A at the center having a thickness corresponding to the inclination angle θ1 of the inclined surface 6, and an annular softening portion 7B whose thickness is gradually reduced from the base portion 5 toward the outer periphery. Even if solely the fusion bonding projection 4 is fused, the fusion part 7A of the plastic deformation portion 7 continuous therewith is also placed in a fused state, and the fusion heat is conducted to the softening portion 7B to soften this portion. The pressurization force is applied continuously, so the end surface 6 of the inclined enlarged diameter part 3, that is, of the softening portion 7B, is brought into junction with the surface 9A of the steel sheet part 9, with the metal material of the softening portion 7B flowing toward the fused portion 17 at the center.

The metal material of the softening portion 7B tends to flow toward the outer periphery due to the pressurization. However, due to the reaction force thereof, the metal material flows, as indicated by the arrows 7C, toward the deformable fused portion 17 at the center to effect the above-mentioned junction. At this time, the flow pressure of the metal material is applied from the outer peripheral side to the fused portion 17 at the center, so the fused portion 17 expands and grows in the axial direction of the bolt 1, whereby the fusion depth of the steel sheet part 9 increases. Further, the portion of the softening portion 7B with larger thickness and nearer to the fusion part 7A is at higher temperature than the outer peripheral portion thereof, so the deformability of the portion with larger thickness is obtained to a sufficient degree, thereby making it possible to secure in a satisfactory manner the flow of the metal material toward the fused portion 17.

Due to the fusion and deformation behavior as described above of the plastic deformation portion 7, a limited fused portion is formed in the region of the fusion bonding projection 4. Further, a fusion depth L2 thereof is of a sufficient value in terms of weld strength. Further, the softening portion 7B is heated by the fusion heat of the fusion bonding projection 4 and the fusion part 7A, so the softening portion 7B exhibits a satisfactory deformability, and the end surface 6 of the inclined enlarged diameter part 3 is reliably brought into junction with the surface 9A of the steel sheet part 9.

Figure 5A:
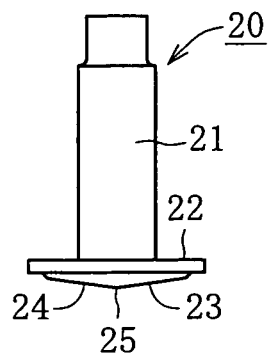
FIG. 5A is a front view of a conventional bolt.
Figure 5B:
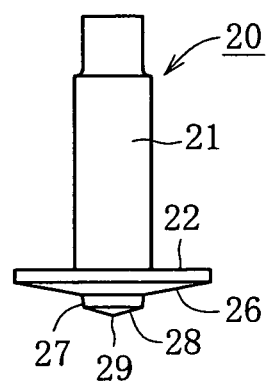
FIG. 5B is a front view of a conventional bolt.
Figure 5C:
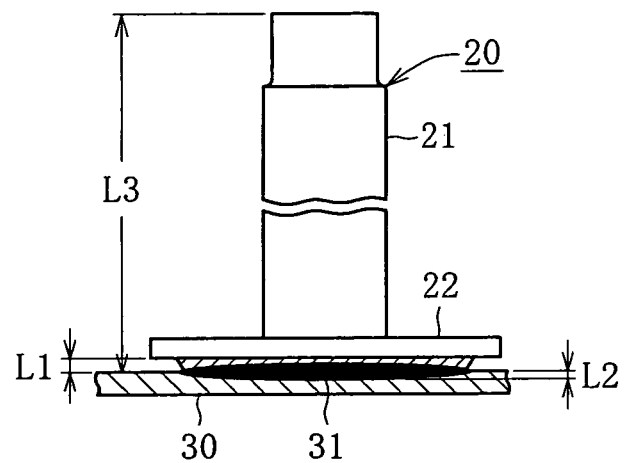
FIG. 5C is a sectional view illustrating how the conventional bolt is fusion-bonded.
Figure 5D:
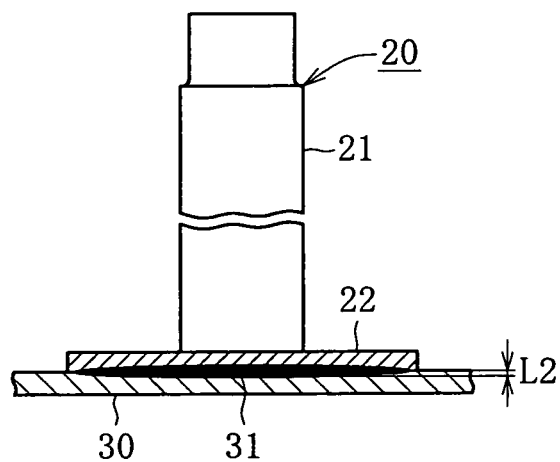
FIG. 5D is a sectional view illustrating how the conventional bolt is fusion-bonded.

As stated above, the thickness of the steel sheet part 9 is 0.7 mm, and the fusion depth L2 as shown in FIG. 3G attained through the above-mentioned process is approximately 0.35 mm. The fusion depth L2 in a case of the large fusion bonding area as shown in FIGS. 5C and 5D is approximately 0.15 mm (Comparative Example), so it is to be determined that the above-mentioned fusion depth of approximately 0.35 mm is a sufficient one. Further, since the non-fusion depth of the steel sheet part 9 is approximately 0.35 mm, it is to be recognized that the rigidity of the steel sheet part 9 itself is not impaired.

A total thickness L4 of the fused portion 17 as measured from the enlarged diameter part 3 side to the steel sheet part 9 side is approximately 0.5 mm. Since the thickness L4 of the fused portion as shown in FIGS. 5C and 5D is approximately 0.25 mm (Comparative Example), it is to be determined that the above-mentioned fusion thickness L4 of approximately 0.5 mm is a sufficient one.

As a result of welding ten bolts 1, the above-mentioned fusion depth L2 is distributed within a range from 0.30 to 0.40 mm. The fusion depth L4 ranges from 0.40 to 0.55 mm. From those ranges, it is to be determined that the depths L2 and L4 are satisfactory fusion depths.

An impact test was conducted in which striking by a hammer was effected in the diametric direction of the shaft part 2, with the steel sheet part 9 fusion-bonded as described above being fixed in position by a jig or the like. As a result, the shaft part 2 underwent bending deformation, but no separation or the like occurred to the fusion bonding portion 17, and the junction between the inclined surface 6 and the surface 9A of the steel sheet was maintained. Thus, it was ascertained that a perfect fusion bonding state was ensured. Thus, it was recognized that sufficient weld strength was ensured.

Figure 6:
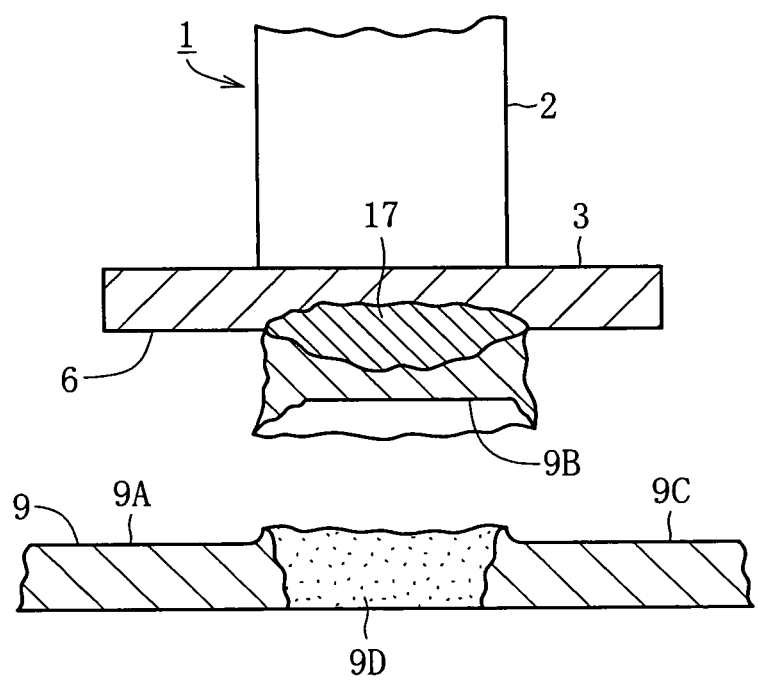
FIG. 6 is a sectional view illustrating a state attained through tensile test.

Further, as a result of a test in which the shaft part 2 was pulled in the axial direction, with the steel sheet part 9 fixed in position by a jig, a rupture state as shown in FIG. 6 was attained. In this way, it is to be recognized that the portion 9B of the steel sheet part 9 fusion-bonded to the fusion bonding projection 4 is ruptured from the main body 9C of the steel sheet part 9 in a sheared state, resulting in an empty hole 9D. This rupture occurs within a tensile load range of 4200 to 5250 N, so it is to be determined that the weld strength is a sufficient one for a bolt 1 of this size.

Judging from the above-mentioned number of bolts welded, the fusion depth L2 is distributed within the range of 43 to 57% of the thickness of the steel sheet part 9, and the diameter of the fused portion 17 shown in FIG. 3E ranges from 0.98 to 1.04 times the diameter of the fusion bonding projection 4 (diameter of base portion 5). The optimum of those values are 50% and 1.01 to 1.02 times, respectively, and more preferably, 46 to 54% and 1.00 to 1.03 times. The values allowing adoption are 43 to 57% and 0.98 to 1.04 times respectively.

Further, the ratio of the volume of the fusion part 7A to that of the softening portion 7B is 1.5. The volume of the softening portion 7B is thus set large, so the heat capacity of the softening portion 7B with respect to the fusion part 7A is large, and the softening portion 7B is not placed in a fused state by the heat from the fusion part 7A but undergoes a heating suitable for promoting softening. The ratio of the volume of the softening portion 7B with respect to the volume of the fusion part 7A is 1.2 to 1.8, more preferably, 1.3 to 1.7, and most preferably, 1.5.

While it is not disclosed in Claims, it is possible to make an invention by specifying the flow behavior of the portions such as the fusion part 7A and the softening portion 7B, the ratio of the fusion depth L2 with respect to the thickness of the steel sheet part, the multiple of the diameter of the fused portion 17 with respect to the diameter of the fusion bonding projection 4, etc.

When the ratio of the diameter of the fusion bonding projection 4 with respect to the diameter of the enlarged diameter part 3 is less than 0.3, the fusion range will be excessively small, and the weld strength will be rather insufficient. When the above-mentioned ratio exceeds 0.6, while it is possible to secure a sufficient fusion range, there is a shortage of the dimension in the diametric direction of the junction portion between the end surface 6 of the enlarged diameter part 3 and the surface 9A of the steel sheet part 9, making it impossible to secure the requisite rigidity with respect to bending load applied the shaft part 2. Thus, by setting the above-mentioned ratio to 0.3 to 0.6, it is possible to secure sufficient weld strength.

The above-mentioned ratio is set to 0.3 to 0.6, more preferably, 0.35 to 0.55, and most preferably, 0.5 as in this embodiment.

When the ratio of the volume of the main fusion part 4B with respect to the volume of the initial fusion part 4A is less than 4.0, the volume of the initial fusion part 4A becomes excessively large, and the heat capacity thereof becomes excessive. Further, the volume of the fusion bonding projection 4 also becomes excessively large, so due to the fusion of the fusion bonding projection 4 as a whole, the fusion amount of the steel sheet part 9 in the thickness direction becomes excessive, making it impossible to obtain an appropriate weld strength. When the above-mentioned ratio exceeds 6.5, the volume of the initial fusion part 4A becomes excessively small, and the heat capacity thereof becomes insufficient, so it is impossible to continuously fuse the main fusion part 4B, resulting in a shortage of the fusion depth of the steel sheet part 9. Thus, the above-mentioned ratio is set to 4.0 to 6.5, whereby it is possible to secure sufficient weld strength.

The above-mentioned ratio is set to 4.0 to 6.5, more preferably, 4.5 to 6.0, and most preferably, 5.2 as in this embodiment.

When the ratio of the volume of the plastic deformation portion 7 with respect to the volume of the fusion bonding projection 4 becomes less than 1.3, the volume of the plastic deformation portion 7 becomes excessively small with respect to the volume of the fusion bonding projection 4, and the plastic deformation portion 7 begins to be fused toward the outer periphery by the fusion heat of the fusion bonding projection 4. In this way, the fusion heat of the fusion bonding projection 4 is spent on the fusion of the plastic deformation portion 7 toward the outer periphery, so the fusion amount in the thickness direction of the steel sheet part 9 is insufficient, resulting in a shortage of the fusion depth L2. At the same time, when the plastic deformation portion 7 is fused toward the outer periphery, while the fusion range 17 is enlarged, the fusion depth L2 becomes insufficient. When the above-mentioned ratio exceeds 2.0, the volume of the plastic deformation portion 7 becomes excessively large with respect to the volume of the fusion bonding projection 4, and the heating of the plastic deformation portion 7 with the fusion heat of the fusion bonding projection 4 becomes insufficient, making it impossible to soften the plastic deformation portion 7. Thus, the fusion amount of the steel sheet part 9 in the thickness direction is also insufficient, resulting in a shortage of the fusion depth L2. Thus, by setting the above-mentioned ratio to 1.3 to 2.0, it is possible to secure sufficient weld strength.

The above-mentioned ratio is set to 1.3 to 2.0, more preferably, 1.5 to 1.8, and most preferably, 1.66 as in this embodiment.

When the inclination angle $\theta 2$ of the tapered portion 15 of the initial fusion part 4A is less than 5 degrees, the expansion of the fusion-bonded portion 17 progresses rapidly even with a slight pressurization displacement, so the pressurization force becomes hard to control. Further, with the pressurization, a reduction in the current density progresses rapidly, so the generation of Joule heat becomes rather slow, with the result that the transition to the fusion of the main fusion part 4B is not effected smoothly. When the inclination angle exceeds 14 degrees, the progress of the expansion of the fusion bonding portion 17 becomes slow even with a large pressurization displacement, so the pressurization force is hard to control. At the same time, transition to the fusion of the main fusion part 4B is not effected smoothly. Further, when the inclination angle exceeds 14 degrees, the volume of the fusion bonding projection 4 becomes large with respect to the volume of the plastic deformation portion 7, making it impossible to effect proper heating and softening on the plastic deformation portion 7. Thus, by setting the above-mentioned inclination angle to 5 to 14 degrees, it is possible to secure a bolt welding of satisfactory quality.

The above-mentioned inclination angle $\theta 2$ is set to 5 to 14 degrees, more preferably, 7 to 12 degrees, and most preferably, 9 degrees as in this embodiment.

When the inclination angle $\theta 1$ of the inclined surface 6 of the plastic deformation portion 7 is less than 5 degrees, the force component (see arrows 7C of FIG. 3F) causing the metal material 7A of the softened inclined portion to flow toward the fused portion 17 at the center due to pressurization is reduced. Accordingly, the pressurization force applied to the fused portion 17 from the outer peripheral side is insufficient, and the expansion and growth of the fused portion 17 in the axial direction of the bolt becomes slow, making it impossible to secure a sufficient fusion depth L2. At the same time, the volume of the plastic deformation portion 7 becomes excessively small with respect to the volume of the fusion bonding projection 4, making it impossible to properly obtain the ratio of the two volumes. Further, when the inclination angle $\theta 1$ exceeds 14 degrees, the volume of the plastic deformation portion 7 becomes excessively large with respect to the volume of the fusion bonding projection 4, making it rather difficult to sufficiently heat the plastic deformation portion 7 with the fusion heat of the fusion bonding projection 4. At the same time, the fusion heat of the fusion bonding projection 4 is taken away by the plastic deformation portion 7, so the fusion depth L2 of the steel sheet part 9 becomes insufficient. Thus, by setting the above-mentioned inclination angle $\theta 1$ to 5 to 14 degrees, it is possible to ensure a bolt welding of satisfactory quality.

The above-mentioned inclination angle $\theta 1$ is set to 5 to 14 degrees, more preferably, 7 to 12 degrees, and most preferably, 9 degrees as in this embodiment.

Figure 1C:
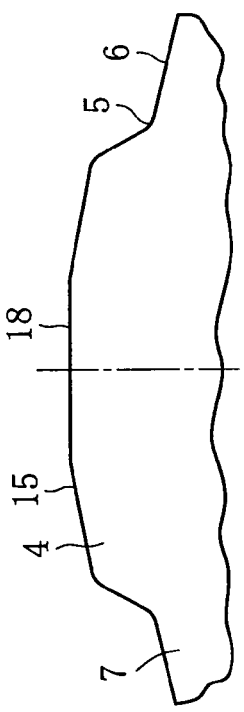
FIG. 1C is a partial enlarged view, similar to FIG. 1B, showing a modification.

Further, as shown in FIG. 1C, also in a case in which, instead of forming the crest 16, a small flat circular surface 18 is provided at the center, it is possible to perform welding in a satisfactory manner.

The effects of the above-mentioned embodiment are as follows.

When, after the fusion bonding projection 4 has been pressed against the steel sheet part 9, energization with welding current is effected, the initial fusion part 4A is fused over its entire region at an initial stage of energization. In this fusion, since the tapered portion 15 of a small inclination angle is formed on the initial fusion part 4A, the radial, substantially planar fusion range 17 expands in a circle in the diametric direction with the pressurization. This entire-region fusion of the initial fusion part 4A is turned into the fusion of the main fusion part 4B over the entire circular section thereof, and fusion progresses in the axial direction of the bolt 1. At the time when this progress of fusion is completed, fusion is also underway in the steel sheet part 9 over an area range corresponding to the fusion bonding projection 4. By stopping the energization at this time, the fusion range 17 is limited to the region of the fusion bonding projection 4. Further, due to the above-mentioned pressurization, the end surface 6 of the enlarged diameter part 3 in the outer periphery of the fusion bonding projection 4 is brought into junction with the surface 9A of the steel sheet part 9.

As described above, the total fusion of the initial fusion part 4 is turned into fusion of the main fusion part 4B over the entire circular section thereof and progresses in the axial direction of the bolt 1, so the fusion occurring on the steel sheet part 9 side is restricted to the region of the fusion bonding projection 4. Since this fusion is thus restricted, the fusion depth L2 on the steel sheet part 9 side increases to thereby achieve an improvement in terms of weld strength. At the same time, the end surface 6 of the enlarged diameter part 3 on the outer peripheral side of the fusion bonding projection 4 is brought into junction with the surface 9A of the steel sheet part 9. As a result, the sufficient weld strength at the center and the above-mentioned junction are combined with each other, whereby it is possible to secure high weld strength while avoiding inclination of the bolt and maintaining a uniform axial length L3. Thus, even if a bending load is applied, separation of the fusion bonding portion 17 does not easily occur. Further, the energization is effected such that solely the fusion bonding projection 4 is fused, it is only necessary to set energization conditions such as current value and energization time adapted to the volume of the fusion bonding projection 4. As a result, the factors for setting the energization conditions are simplified, and the energization control becomes easier to perform, thereby stabilizing the welding quality. At the same time, the power consumption is reduced, which is economical.

That is, a fusion bonding state in which the fusion depth L2 is large is attained in a small region at the center, and the end surface region spaced apart from the fusion bonding portion 17 and extending to the peripheral edge portion of the enlarged diameter part 3 is held in junction with the surface 9A of the steel sheet part 9. Thus, the requisite weld strength is secured in the central portion, and it is possible to attain high rigidity with respect to bending load due to the above-mentioned junction and the fusion bonding of the central portion.

By connecting the outer peripheral portion of the enlarged diameter part 3 and the base portion 5 of the fusion bonding projection 4 by means of the inclined surface 6 whose outer peripheral portion is lower, the plastic deformation portion 7 is formed on the end surface of the enlarged diameter part 3. The plastic deformation portion 7 includes the circular fusion part 7A at the center having a thickness corresponding to the inclination angle θ1 of the inclined surface 6, and of the annular softening portion 7B whose thickness is gradually reduced from the base portion 5 toward the outer periphery.

The plastic deformation portion 7 includes the circular fusion part 7A at the center having a thickness corresponding to the inclination angle θ1 of the inclined surface 6, and of the annular softening portion 7B whose thickness is gradually reduced from the base portion 5 toward the outer periphery. Even if solely the fusion bonding projection 4 is fused, the fusion part 7A of the plastic deformation portion 7 continuous therewith is also placed in a fused state, and the fusion heat is conducted to the softening portion 7B to soften this portion. Since the pressurization force is continuously applied, the end surface 6 of the inclined enlarged diameter part 3, that is, of the softening portion 7B, is brought into junction with the surface 9A of the steel sheet part 9, with the metal material of the softening portion 7B flowing toward the fused portion 17 at the center.

The metal material of the softening portion 7B tends to flow toward the outer periphery due to the pressurization. However, due to the reaction force thereof, the metal material flows toward the deformable fused portion 17 at the center, thereby effecting the above-mentioned junction. At this time, the flow pressure of the metal material acts on the fused portion 17 at the center from the outer peripheral side, so the fused portion 17 expands and grows in the axial direction of the bolt 1, whereby the fusion depth of the steel sheet part 9 increases. Further, since the portion of the softening portion 7B with larger thickness and nearer to the fusion part 7A is at a higher temperature than the outer peripheral portion thereof, deformability of the portion with larger thickness is obtained to a sufficient degree, and the flow of the metal material (7B) toward the fused portion 17 can be secured in a satisfactory manner.

Due to the above-mentioned fusion and deformation behavior of the plastic deformation portion 7, fusion restricted to the region of the fusion bonding projection 4 is attained; further, the fusion depth L2 is of a sufficient value in terms of weld strength. Further, since the softening portion 7B is heated with the fusion heat of the fusion bonding projection 4 and the fusion part 7A, its deformability is satisfactory, and the inclined end surface 6 of the enlarged diameter part 3 is reliably brought into junction with the surface 9A of the steel sheet part 9.

The ratio of the diameter of the fusion bonding projection 4 to the diameter of the enlarged diameter part 3 ranges from 0.3 to 0.6.

When the above-mentioned ratio is less than 0.3, the fusion range 17 is excessively small, and the weld strength is insufficient. When the above-mentioned ratio exceeds 0.6, while it is possible to secure the fusion range 17 to a sufficient degree, the dimension in the diametric direction of the portion where the end surface 6 of the enlarged surface part 3 and the surface 9A of the steel sheet part 9 are held in junction with each other is rather insufficient, so it is impossible to secure the requisite rigidity with respect to the bending load of the shaft part 2. Thus, by setting the above-mentioned ratio to 0.3 to 0.6, it is possible to secure sufficient weld strength.

The ratio of the volume of the main fusion part 4B to the volume of the initial fusion part 4A ranges from 4.0 to 6.5.

When the above-mentioned ratio is less than 4.0, the volume of the initial fusion part 4A becomes excessively large, and the heat capacity thereof becomes excessive. Further, the volume of the fusion bonding projection 4 also becomes excessively large, so the fusion amount in the thickness direction of the steel sheet part 9 becomes excessive due to the fusion of the fusion bonding projection 4 as a whole, making it impossible to obtain an appropriate weld strength. When the above-mentioned ratio exceeds 6.5, the volume of the initial fusion part 4A becomes excessively small, and the heat capacity thereof becomes insufficient. Accordingly, it is impossible to continuously fuse the main fusion part 4B, resulting in a shortage of the fusion depth L2 of the steel sheet part 9. Thus, the above-mentioned ratio is set to 4.0 to 6.5, whereby it is possible to secure sufficient weld strength.

The volume of the fusion bonding projection 4 is set smaller than the volume of the plastic deformation portion 7.

Since the volume of the fusion bonding projection 4 is set smaller than the volume of the plastic deformation portion 7, there is no fear of a state being attained in which the plastic deformation portion 7 is fused toward the outer periphery by the heat amount causing the fusion of the fusion bonding projection 4, the plastic deformation portion 7 being only maintained in a heated state. That is, while continuously generated Joule heat is gradually conducted to the plastic deformation portion 7 via the fused portion of the fusion bonding projection 4 to fuse the fusion part 7A, the softening portion 7B is not heated to such a degree as to undergo fusion but is only heated to be softened. Thus, the fusion range is restricted to the region of the fusion bonding projection 4; further, the fusion of the steel sheet part 9 in the thickness direction is promoted, whereby a predetermined fusion depth L2 is attained.

The ratio of the volume of the plastic deformation portion 7 to the volume of the fusion bonding projection 4 ranges from 1.3 to 2.0.

When the above-mentioned ratio is less than 1.3, the volume of the plastic deformation portion 7 becomes excessively small with respect to the volume of the fusion bonding projection 4, and the softening portion 7B of the plastic deformation portion 7 is fused toward the outer periphery by the fusion heat of the fusion boding projection 4. Since the fusion heat of the fusion bonding projection 4 is thus spent on the fusion of the softening portion 7B, the fusion amount in the thickness direction of the steel sheet part 9 is insufficient, resulting in an insufficient fusion depth L2. At the same time, when the plastic deformation portion 7 is fused toward the outer periphery, while the fusion range increases, the fusion depth L2 is insufficient. Further, when the above-mentioned ratio exceeds 2.0, the volume of the plastic deformation portion 7 becomes excessively large with respect to the volume of the fusion bonding projection 4, and the heating of the softening portion 7B with the fusion heat of the fusion bonding projection 4 becomes insufficient, making it impossible to soften the softening portion 7B. Thus, the fusion amount in the thickness direction of the steel sheet part 9 becomes insufficient, resulting in an insufficient fusion depth L2. Thus, by setting the above-mentioned ratio to 1.3 to 2.0, it is possible to secure sufficient weld strength.

The inclination angle θ2 of the tapered portion 15 of the initial fusion part 4A ranges from 5 to 14 degrees.

When the above-mentioned inclination angle θ2 is less than 5 degrees, the expansion of the fusion bonding portion 17 progresses rapidly even with a slight pressurization displacement, so the pressurization force is hard to control. Further, with the pressurization, a reduction in the current density progresses rapidly, so the generation of Joule heat becomes slower, with the result that the transition to the fusion of the main fusion part 4B is not effected smoothly. When the inclination angle θ2 exceeds 14 degrees, the progress of the expansion of the fusion bonding portion 17 becomes slow even with a large pressurization displacement. As a result, the pressurization force is hard to control in this case also, and at the same time, the transition to the fusion of the main fusion part 4B is not effected smoothly. Further, when the inclination angle θ2 exceeds 14 degrees, the volume of the fusion bonding projection 4 becomes large with respect to the volume of the plastic deformation portion 7, making it impossible to effect proper heating and softening on the plastic deformation portion 7. Thus, by setting the above-mentioned inclination angle θ2 to 5 to 14 degrees, it is possible to secure a bolt welding of satisfactory quality.

The inclination angle θ1 of the inclined surface 6 of the plastic deformation portion 7 ranges from 5 to 14 degrees.

When the above-mentioned inclination angle θ1 is less than 5 degrees, the force component (see the arrows 7C in FIG. 3F) causing the metal material of the softening portion 7B to flow toward the fused portion 17 at the center due to the pressurization is reduced, so the pressurization force applied to the fused portion 17 from the outer peripheral side is rather insufficient, and the expansion and growth of the fused portion 17 in the axial direction of the bolt is slow, making it impossible to secure a sufficient fusion depth L2. At the same time, the volume of the plastic deformation portion 7 with respect to the volume of the fusion welding projection 4 becomes excessively small, making it impossible to obtain a proper ratio of the two volumes. When the above-mentioned inclination angle exceeds 14 degrees, the volume of the plastic deformation portion 7 with respect to the volume of the fusion bonding projection 4 becomes excessively large, making it rather difficult to fuse the fusion part 7A of the plastic deformation portion and to heat the softening portion 7B with the fusion heat of the fusion bonding projection 4. At the same time, the fusion heat of the fusion bonding projection 4 is taken away to an excessive degree by the plastic deformation portion 7, resulting in an insufficient fusion depth L2 of the steel sheet part 9. Thus, by setting the above-mentioned inclination angle θ1 to 5 to 14 degrees, it is possible to secure a bolt welding of satisfactory quality.

By specifying the various values, etc. mentioned above, the fusion range 17 is limited as described above through the fusion of the fusion bonding projection 4 only, and an appropriate fusion depth L2 is secured. Further, the end surface 6 of the enlarged diameter part is reliably brought into junction with the surface 9A of the steel sheet part 9.

The effects of the welding method are as follows.

The welding method of the present invention has been provided with a view toward solving the above-mentioned problems, the method including the steps of: preparing the bolt 1 for projection welding including the shaft part 2 having the male screw 8, the circular enlarged diameter part 3 formed integrally with the shaft part 2 and having a larger diameter than the diameter of the shaft part 2, and the circular fusion bonding projection 4 including the initial fusion part 4A having at its end surface the tapered portion 15 of a small inclination angle θ2 reduced in height on the outer peripheral side and the main fusion part 4B continuous with the initial fusion part 4A, and arranged at the center of the enlarged diameter part on the side opposite to the shaft part 2; and effecting pressurization of the fusion bonding projection 4 against the steel sheet part 9 and then effecting energization the same to thereby perform welding, with the pressurization and energization conditions being set such that exclusively the fusion bonding projection 4 is fused to fusion-bond the region thereof to the steel sheet part 9 and that the end surface 6 of the enlarged diameter part 3 on the outer peripheral side thereof is brought into junction with the surface 9A of the steel sheet part 9.

The effects of the welding method is basically the same as those of the above-mentioned bolt.

As described above, the pressurization and energization conditions are set such that exclusively the fusion bonding projection 4 is fused to fusion-bond the region thereof to the steel sheet part 9 and that the end surface 6 of the enlarged diameter part 3 on the outer peripheral side thereof is brought into junction with the surface 9A of the steel sheet part 9. At this time, the fusion progresses as follows: total fusion of the initial fusion part 4A is turned into fusion of the main fusion part 4B over the entire circular section thereof and progresses in the axial direction of the bolt 1, with the fusion occurring therewith on the steel sheet part 9 side being restricted to the region of the fusion bonding projection 4. Since the fusion is thus restricted, the fusion depth L2 on the steel sheet part 9 side increases, and the weld strength is enhanced. At the same time, the end surface 6 of the enlarged diameter part 3 on the outer peripheral side of the fusion bonding projection 4 is brought into junction with the surface 9A of the steel sheet part 9, so the sufficient weld strength in the central portion and the above-mentioned junction are combined with each other, making it possible to secure high weld strength while avoiding inclination of the bolt 1 and maintaining a uniform length L3 of the shaft part. Thus, even if a bending load is applied, the fusion bonding portion 17 is not easily separated. Further, the energization is effected under a condition in which exclusively the fusion bonding projection 4 is fused, so it is only necessary to set energization conditions such as current value and energization time adapted to the volume of the fusion bonding projection 4. As a result, the factors in setting the energization conditions are simplified, and energization control is easy to perform, thereby stabilizing the welding quality. At the same time, the power consumption is reduced, which is economical.

That is, a fusion bonding state of large fusion depth L2 in the central portion is attained in a small region, and the end surface region spaced apart from the fusion bonding portion 17 and extending to the peripheral edge portion of the enlarged diameter part 3 is held in junction with the steel sheet part 9. Thus, the requisite weld strength is secured in the central portion, and it is possible to attain high rigidity with respect to bending load due to the above-mentioned junction and the fusion bonding of the central portion.

The pressurization and energization conditions are set so as to secure in a satisfactory state the above-mentioned fusion range 17, the fusion depth L2, and the junction of the end surface 6 of the enlarged diameter part. As the conditions for fusing exclusively the fusion bonding projection 4, the current value and the energization time are set to predetermined values, of which the energization time is of particular importance. The energization is started after the pressurization, and is continued from the fusion start of the initial fusion part 4A until the completion of the fusion of the main fusion part 4B. Further, the pressurization force applied to the steel sheet part 9 is set such that the fusion range 17 of the fusion bonding projection 4 does not expand toward the outer periphery and that the fusion depth L2 of the steel sheet part 9 is set to a predetermined value. Further, with the fusion range 17 and the fusion depth L2 being properly obtained, the end surface 6 of the enlarged diameter part is brought into junction with the surface 9A of the steel sheet part 9.

Formed on the bolt 1 for projection welding is the plastic deformation portion 7 connecting the outer peripheral portion of the enlarged diameter part 3 and the base portion 5 of the fusion bonding projection 4 by the inclined surface 6 whose height is smaller on the outer peripheral side. The plastic deformation portion 7 includes the circular fusion part 7A at the center having a thickness corresponding to the inclination angle $\theta 1$ of the inclined surface 6, and the annular softening portion 7B whose thickness is gradually reduced from the base portion 5 toward the outer periphery, the deformation of the softening portion 7B being promoted by the fusion heat of the circular fusion part 7A.

The plastic deformation portion 7 includes the circular fusion part 7A at the center having a thickness corresponding to the inclination angle $\theta 1$ of the inclined surface 6, and the annular softening portion 7B whose thickness is gradually reduced from the base portion 5 toward the outer periphery. Even if exclusively the fusion bonding projection 4 is fused, the fusion part 7A of the plastic deformation portion 7 continuous therewith is also placed in a fused state, and the fusion heat is conducted to the softening portion 7B to soften this portion. Since the pressurization force is continuously applied, the end surface 6 of the inclined enlarged diameter part 3, that is, the softening portion 7B, is brought into junction with the surface 9A of the steel sheet part 9, with the metal material of the softening portion 7B flowing toward the fused portion 17 at the center.

The metal material of the softening portion 7B tends to flow toward the outer periphery due to the pressurization. However, due to the reaction force thereof, the metal material flows toward the fused portion 17 at the center having deformability, thus effecting the above-mentioned junction. At this time, the flow pressure of the metal material (7B) is applied from the outer peripheral side to the fused portion 17 at the center, so the fused portion 17 expands and grows in the axial direction of the bolt 1, whereby the fusion depth L2 of the steel sheet part 9 increases. Further, since the portion of the softening portion 7B nearer to the fusion part 7A and of a larger thickness is at a higher temperature than the portion thereof on the outer peripheral side, it is possible to obtain a sufficient deformability for the portion of a larger thickness, thereby making it possible to secure in a satisfactory manner the flow of the metal material (7B) toward the fused portion 17.

Due to the above-mentioned fusion and deformation behavior of the plastic deformation portion 7, fusion restricted to the region of the fusion bonding projection 4 is attained. Further, the fusion depth L2 thereof is of a sufficient value in terms of weld strength. Further, since the softening portion 7B is heated by the fusion heat of the fusion bonding projection 4 and the fusion part 7A, its deformability is satisfactory, and the inclined end surface 6 of the enlarged diameter part 3 is reliably brought into junction with the surface 9A of the steel sheet part 9.

The above-mentioned pressurization and energization conditions are suitable for the fusion of the region of the fusion bonding projection 4 and the steel sheet part 9 opposed thereto.

Due to this setting of the pressurization and energization conditions, the fusion range 17 is set to the range of the fusion bonding projection 4, and the fusion depth L2 can be set to a predetermined value.

The energization with welding current is executed until the completion of the fusion of the main fusion part 4B subsequent to the total fusion of the initial fusion part 4A at the initial stage of energization.

By performing this energization control, it is possible to properly fuse exclusively the fusion bonding projection 4.

As is apparent from the above-mentioned embodiments, by executing the welding method according to ninth to twelfth aspects of the present invention, with the specified various values, etc. according to third to eighth aspects of the present invention, it is possible to realize a satisfactory welding as described above.

Industrial Applicability

As described above, according to the present invention, it is possible to secure a satisfactory welding quality through setting of the volumes of the fusion bonding projection and of the plastic deformation portion, the pressurization and energization conditions, etc. Thus, it is to be expected that the present invention will find a variety of applications such as an automotive vehicle body welding process and an electric-household-appliance steel sheet welding process.

The invention claimed is:

1. A bolt for being projection welded to a sheet part, the bolt comprising:
    a shaft part having a male screw;
    a circular enlarged diameter part formed integrally with the shaft part, the enlarged diameter part having a diameter larger than that of the shaft part and having an outer peripheral portion at an outermost periphery in a radial direction of the bolt;
    a circular fusion bonding projection including
    (i) an initial fusion part having at an end surface thereof a tapered portion with an inclination angle, the tapered portion being configured such that the initial fusion part is reduced in height toward an outer periphery thereof, and
    (ii) a main fusion part continuous with the initial fusion part;
    a plastic deformation portion disposed on an end surface of the enlarged diameter part and having an inclined surface which connects the outer peripheral portion of the enlarged diameter part with a base portion of the fusion bonding projection, the inclined surface being configured such that the plastic deformation portion is reduced in height toward an outer periphery thereof,
    wherein the fusion bonding projection is disposed at a center of the enlarged diameter part on a side opposite to the shaft part,
    wherein the bolt is configured to be projection welded by energizing only the fusion bonding projection with welding current for fusing the fusion bonding projection,
    wherein the bolt is configured such that pressurizing the fusion bonding projection against the sheet part and energizing the fusion bonding projection fusion-bonds the fusion bonding projection to the sheet part and brings an end surface of the enlarged diameter part on the outer peripheral side thereof into junction with a surface of the sheet part, and wherein the plastic deformation portion includes a central circular fusion part having a thickness corresponding to an inclination angle of the inclined surface, and an annular softening portion gradually reduced in thickness from the base portion toward the outer peripheral portion.

2. The bolt of claim 1, wherein a ratio of a diameter of the fusion bonding projection to the diameter of the enlarged diameter part is 0.3 to 0.6.

3. The bolt of claim 1, wherein a ratio of a volume of the main fusion part to a volume of the initial fusion part is 4.0 to 6.5.

4. The bolt of claim 1, wherein the volume of the fusion bonding projection is smaller than the volume of the plastic deformation portion.

5. The bolt of claim 1, wherein a ratio of the volume of the plastic deformation portion to the volume of the fusion bonding projection is 1.3 to 2.0.

6. The bolt of claim 1, wherein the inclination angle of the tapered portion of the initial fusion part is 5 to 14 degrees.

7. The bolt of claim 1, wherein the inclination angle of the inclined surface of the plastic deformation portion is 5 to 14 degrees.

8. The bolt of claim 1, wherein a ratio of a diameter of the fusion bonding projection to the diameter of the enlarged diameter part is 0.3 to 0.6,
    wherein a ratio of a volume of the main fusion part to a volume of the initial fusion part is 4.0 to 6.5,
    wherein the volume of the fusion bonding projection is smaller than the volume of the plastic deformation portion,
    wherein a ratio of the volume of the plastic deformation portion to the volume of the fusion bonding projection is 1.3 to 2.0,
    wherein the inclination angle of the tapered portion of the initial fusion part is 5 to 14 degrees, and
    wherein the inclination angle of the inclined surface of the plastic deformation portion is 5 to 14 degrees.

9. The bolt of claim 1, wherein the plastic deformation portion is configured such that the softening portion is softened by the heat of the projection welding and plastically deforms during the projection welding.

10. A method of projection welding a bolt, the method comprising:
    providing a bolt for projection welding, the bolt comprising:
        a shaft part having a male screw;
        a circular enlarged diameter part formed integrally with the shaft part, the enlarged diameter part having a diameter larger than that of the shaft part and having an outer peripheral portion at an outermost periphery in a radial direction of the bolt;
        a circular fusion bonding projection including
            (i) an initial fusion part having at an end surface thereof a tapered portion with an inclination angle, the tapered portion being configured such that the initial fusion part is reduced in height toward an outer periphery thereof, and
            (ii) a main fusion part continuous with the initial fusion part; and
        a plastic deformation portion disposed on an end surface of the enlarged diameter part and having an inclined surface which connects the outer peripheral portion of the enlarged diameter part with a base portion of the fusion bonding projection, the inclined surface being configured such that the plastic deformation portion is reduced in height toward an outer periphery thereof,
        wherein the fusion bonding projection is disposed at the center of the enlarged diameter part on the side opposite to the shaft part;
        wherein the plastic deformation portion includes a central circular fusion part having a thickness corresponding to an inclination angle of the inclined surface, and an annular softening portion gradually reduced in thickness from the base portion toward the outer peripheral portion; and
    projection welding the bolt to a sheet part by pressurizing the fusion bonding projection against the sheet part and then energizing the fusion bonding projection,
        wherein said pressurizing and energizing are performed such that the fusion bonding projection is fusion-bonded to the sheet part, and an end surface of the enlarged diameter part on the outer peripheral side thereof is brought into junction with the surface of the sheet part.

11. The method of claim 10, wherein said energizing is performed until an entire area of the initial fusion part is fused to the sheet part and the main fusion part is subsequently fused to the sheet part.

12. The method of claim 10, wherein a ratio of a diameter of the fusion bonding projection to the diameter of the enlarged diameter part is 0.3 to 0.6.

13. The method of claim 10, wherein a ratio of a volume of the main fusion part to a volume of the initial fusion part is 4.0 to 6.5.

14. The method of claim 10, wherein the volume of the fusion bonding projection is smaller than the volume of the plastic deformation portion.

15. The method of claim 10, wherein a ratio of the volume of the plastic deformation portion to the volume of the fusion bonding projection is 1.3 to 2.0.

16. The method of claim 10, wherein the inclination angle of the tapered portion of the initial fusion part is 5 to 14 degrees.

17. The method of claim 10, wherein the inclination angle of the inclined surface of the plastic deformation portion is 5 to 14 degrees.

18. The method of claim 10, wherein a ratio of a diameter of the fusion bonding projection to the diameter of the enlarged diameter part is 0.3 to 0.6,
    wherein a ratio of a volume of the main fusion part to a volume of the initial fusion part is 4.0 to 6.5,
    wherein the volume of the fusion bonding projection is smaller than the volume of the plastic deformation portion,
    wherein a ratio of the volume of the plastic deformation portion to the volume of the fusion bonding projection is 1.3 to 2.0,
    wherein the inclination angle of the tapered portion of the initial fusion part is 5 to 14 degrees, and
    wherein the inclination angle of the inclined surface of the plastic deformation portion is 5 to 14 degrees.

19. The method of claim 10, wherein the projection welding is performed such that the softening portion is softened by the heat of the projection welding and plastically deformed during the projection welding.

20. The method of claim 10, wherein the sheet part is steel.

21. The bolt of claim 1, wherein the circular enlarged diameter part, the circular fusion bonding projection, and the plastic deformation portion constitute a bolt head disposed on an end of the shaft part,
    wherein each of the circular enlarged diameter part, the circular fusion bonding projection, and the plastic deformation portion is made of metal, wherein the main fusion part is disposed between the initial fusion part and the plastic deformation portion, and
wherein the main fusion part has an inclination angle different from the inclination angle of the initial fusion part and the inclination angle of the plastic deformation portion.

* * * * *